Patented Jan. 28, 1936

2,028,886

UNITED STATES PATENT OFFICE 2,028,886

POLYMERIZATION OF UNSATURATED HYDROCARBONS

Cary R. Wagner, Chicago, Ill., assignor to The Pure Oil Company, Chicago, Ill., a corporation of Ohio No Drawing. Application January 19, 1929, Serial No. 333,756

10 Claims. (Cl. 196—10)

This invention relates to an improved process for producing liquid hydrocarbons suitable for use as motor fuel, through the polymerization of compounds present in hydrocarbon gases.

In the operation of certain types of pyrogenic cracking processes wherein high boiling point liquid hydrocarbons are molecularly decomposed into hydrocarbons of lower boiling range, a certain proportion of the hydrocarbons treated are discharged in the form of what is known as "fixed gas." The ratio of gas to liquid depends to a large extent upon the conversion temperatures utilized in the process of cracking. Thus in the so-called vapor phase systems, wherein conversion temperatures of the order of 1000° F. or higher are attained by the oil vapors undergoing decomposition, a relatively large quantity of fixed gas is developed in proportion to the liquid condensate obtained as motor fuel. This proportion of fixed gas to liquid motor fuel decreases as the conversion temperatures are lowered, but in ordinary vapor phase operations approximately 60 cubic feet of fixed gas are produced for each gallon of liquid motor fuel. This figure is, of course, approximate and varies with the character of the charging stock and other conversion factors, principally time and temperature.

The question of the economic utilization of this fixed gas becomes a very important one in vapor phase systems of hydrocarbon pyrogenesis. Ordinarily, the fixed gas is too valuable and forms too large a per cent of the products of conversion, to justify its use for combustion purposes in the furnace of the cracking system. Of course, a certain proportion of liquids are obtained from the gases following release thereof from the fractionating apparatus of a cracking system to the customary operation of passing the gas through a compressor, but even after this operation there still remains a relatively large quantity of fixed gas, which if not economically employed may render the operation of vapor phase cracking systems too costly, as compared with the liquid phase system of conversion, to justify commercial activities relative thereto.

It is, therefore, to the recovery of liquids from these fixed gases that the present invention is especially directed. I have discovered that when these hydrocarbon gases, which contain a high per cent of unsaturates are passed into a reaction chamber at high pressures and temperatures (for example, 800 pounds per square inch and 800° F.) and subjected to these conditions for a desired period of time, polymerization reactions take place, without the employment of a catalyst, to the end of building up heavier compounds from said gases which are recoverable as liquids, and are well suited for use as motor fuels.

The invention is preferably carried out by passing a body of unsaturated hydrocarbon gases, of the type developed by the pyrogenic decomposition of oil vapors at temperatures above 1000° F., into a reaction chamber of any suitable mechanical type. Within this chamber the gases are maintained under pressures of between 500 to 1500 pounds per square inch, depending on operating conditions and the specific character of the hydrocarbons under treatment, and are held at temperatures varying between 650 to 1000° F. The rate of flow of the gases through this reaction chamber is regulated so that the gases are subjected to the conditions specified for a period of time varying between 15 seconds to 30 minutes. Under these conditions the gases are in part, at least, polymerized to produce liquid compounds. I have observed that it is not necessary to utilize a catalyst in the reaction chamber, unless the metal walls of such reaction chamber may be considered to constitute a catalyst, it being understood that the reaction chamber is constructed from materials capable of withstanding the pressures and temperatures above noted. It is thought, however, that the walls of the reaction chamber have little or no effect on the gases under treatment in said chamber. In any event, this system does not utilize purposely a catalyst in securing the desired reactions and in this respect, together with others, the present invention may be distinguished from prior systems directed toward somewhat similar ends.

In the reaction chamber the unsaturated hydrocarbons, such as ethylene $C_2H_4$, propylene $C_3H_6$, and butylene $C_4H_8$, which possess what is known as a double bond, when properly treated under the conditions set forth, will react with each other to form additive compounds of higher molecular weights. The operating conditions specified can be regulated so that these compounds can be kept at such molecular weights as to render them suitable for use as motor fuels. The following table sets forth the results secured by four independent operations:

| Run Number | 1 | 2 | 3 | 4 |
|---|---|---|---|---|
| Time | 18-20 sec. | 18-20 sec. | 18-20 sec. | 18-20 sec. |
| Pressure (lbs. per sq. in.) | 800 | 800 | 800 | 800 |
| Temperature (°F.) | 850 | 750 | 700 | 650 |
| Specific gravity, inlet gas | 1.068 | | 1.025 | 0.993 |
| Specific gravity exit gas | 0.980 | 0.992 | 1.015 | 0.954 |
| Percent unsaturates inlet gas | 53.6 | | 52.0 | 53.1 |
| Percent unsaturates exit gas | 43.0 | 49.3 | 49.8 | 49.3 |
| Total gas passed (cu. ft.) | 2380 | 2470 | 2470 | 2360 |
| Cubic feet per minute | 4.96 | 5.14 | 5.13 | 4.91 |
| Temperature into chamber (°F.) | 796 | 740 | 717 | 659 |
| Temperature out of chamber | 844 | 735 | 696 | 635 |
| Gallons E. P. gasoline 1 M cu. ft. | 1.47 | 1.52 | 0.42 | 0.19 |
| Gravity of gasoline (°A. P. I.) | 53.2 | 61.8 | 53.1 | 45.8 |
| Initial | 100 | 85 | 100 | 127 |
| 20 percent | 152 | 116 | 144 | 182 |
| 50 percent | 205 | 168 | 195 | 223 |
| 90 percent | 339 | 322 | 317 | 335 |
| End pt. | 422 | 413 | 420 | 409 |

It is very evident from the above with the gravity and distillation range of these liquid hydrocarbons that they will prove highly anti-knock as motor fuels, since they appear to consist largely of benzol derivatives. This character of the product is due to the type of reaction, since little heat is evolved in the polymerization of olefines except when cyclic compounds are formed as here.

By this system of gasoline recovery a very considerable improvement is made in the percentage of liquid motor fuel produced by vapor phase systems of cracking from a given quantity of charging stock, such as gas oil, the process improving the yield of recovered liquid motor fuel to the extent of approximately 5% of the total quantity of charging stock utilized. Thus if a cracking system yields 40% of liquid motor fuel from the total quantity of the charging stock inserted therein, the balance being removed from the system in the form of fuel oil and fixed gas, the present invention will enable the system to yield liquid motor fuel to the extent of 45% of such charging stock, decreasing correspondingly the relative quantities of gas and fuel oil. It will be understood that the products leaving the reaction chamber of the apparatus are suitably cooled and condensed to separate the gaseous and liquid components.

This application is a continuation in part of my copending application, bearing Ser. No. 256,062, filed Feb. 21, 1928.

What is claimed is:

1. A continuous non-catalytic process of manufacturing gasoline-like hydrocarbons from unsaturated hydrocarbons of the ethylene series, which consists in passing gases having an ethylenic content sufficiently high to produce an exothermic reaction when subjected to the condition of temperature and pressure herein specified through a reaction zone wherein the gases are at reacting temperatures of the order of from 650° F. to 1000° F. and superatmospheric pressures varying between 500 to 1500 pounds per square inch, and in regulating the time of residence of said gases in said zone under the conditions specified to convert a substantial percentage of the gases into gasoline-like aromatic hydrocarbons.

2. A continuous non-catalytic process of manufacturing gasoline-like hydrocarbons from unsaturated hydrocarbons of the ethylene series, which consists in passing gases having an ethylenic content sufficiently high to produce an exothermic reaction when subjected to the condition of temperature and pressure herein specified through a heated zone wherein the gases are subjected to reacting temperatures of the order of from 650° F. to 1000° F., maintaining said gases in a reaction zone at such temperature and pressures varying between 500 to 1500 pounds per square inch, in regulating the time of residence of said gases in said reaction zone under the conditions specified to convert a substantial percentage of the gases into gasoline-like aromatic hydrocarbons, and cooling and separating the liquid and gaseous product discharged from said reaction zone.

3. A continuous non-catalytic process of manufacturing gasoline-like hydrocarbons of benzol character from fixed gases obtained from oil which has been cracked at temperatures of the order of 1000° F. in the vapor phase, and which have an olefinic content sufficient to produce an exothermic reaction when subjected to the condition of temperature and pressure herein specified which consists in passing such gases through a reaction zone wherein the gases are at reacting temperatures of the order of from 650° to 1000° F., while maintained under superatmospheric pressures varying between 500 to 1500 pounds per square inch, and in regulating the time of residence of said gases in said zone under the conditions specified to convert a substantial percentage of the gases into gasoline-like hydrocarbons.

4. A continuous non-catalytic process for converting hydrocarbon gas initially containing ethylene, propylene, and butylene in sufficient quantities to produce an exothermic reaction when subjected to the conditions of temperature and pressure herein specified, which comprises heating the gases sufficiently high to enable them to attain a temperature of approximately 850° F., maintaining the gases at this temperature under a pressure of 800 pounds per square inch for a period of time ranging from 15 seconds to 30 minutes, and separating liquid hydrocarbons containing a large proportion of aromatic compounds and boiling predominantly within the range of gasoline, from the gaseous reaction products.

5. Process according to claim 4 in which the gases are maintained at a pressure between 500 and 800 pounds per square inch.

6. Process according to claim 4 in which the gases are maintained at a pressure between 500 and 800 pounds per square inch and the temperature is maintained at a reacting temperature not in excess of 1000° F.

7. A continuous non-catalytic process for converting hydrocarbon gas initially containing in excess of 50% of ethylene, propylene, and butylene, which comprises heating the gases in the absence of added hydrogen to a degree sufficient to enable the gases to attain an exothermic reacting temperature of approximately 1000° F., maintaining the gases at such temperature under pressure of between 500 and 800 pounds per square inch for a period of time ranging from fifteen seconds to 30 minutes, and separating the liquid composed of a large proportion of aromatic compounds, from gaseous reaction products.

8. A continuous non-catalytic process for converting hydrocarbon gases initially containing ethylene, propylene and butylene in sufficient quantities to produce an exothermic reaction when subjected to the conditions of temperature and pressure herein specified, to liquid hydrocarbons boiling within the gasoline range which consists in compressing the gases to a pressure of from 500 to 1,400 pounds per square inch, heating the gases sufficiently to enable them to attain a temperature of from 650 to 1000° F., and maintaining the gases at the above mentioned conditions of temperature and pressure for a period of time sufficient to polymerize a substantial proportion of the olefinic constituents to aromatic hydrocarbons boiling within the gasoline range.

9. A continuous non-catalytic process for converting hydrocarbon gases initially containing ethylene, propylene and butylene in sufficient quantities to produce an exothermic reaction when subjected to the conditions of temperature and pressure herein specified, to liquid hydrocarbons boiling within the gasoline range which consists in maintaining said gases at pressures ranging from approximately 500 to 1,400 pounds per square inch and at temperatures ranging from approximately 650° to 1000° F. for a period of time sufficient to convert a substantial proportion of said gases to cyclic hydrocarbons including aromatics, and separating the remaining gases from the non-gaseous conversion products.

10. A continuous non-catalytic process for converting hydrocarbon gases initially containing ethylene, propylene and butylene in sufficient quantities to produce an exothermic reaction when subjected to the conditions of temperature and pressure herein specified, to liquid hydrocarbons boiling within the gasoline range which consists in maintaining said gases at a polymerizing temperature not substantially in excess of 1000° F. and at a pressure of approximately 800 pounds per square inch for a period of time sufficient to convert a substantial proportion of said gases to cyclic hydrocarbons including aromatics boiling within the gasoline range, and separating the conversion products from the remaining gases.

CARY R. WAGNER.